United States Patent

Bailey et al.

[11] Patent Number: 5,848,605
[45] Date of Patent: Dec. 15, 1998

[54] CHECK VALVE

[75] Inventors: David C. Bailey, San Jose; Carl A. Martin, Fremont, both of Calif.

[73] Assignee: Cybor Corporation, San Jose, Calif.

[21] Appl. No.: 975,915

[22] Filed: Nov. 12, 1997

[51] Int. Cl.⁶ .................................................. F16K 15/00
[52] U.S. Cl. ..................... 137/540; 137/543.17; 251/367
[58] Field of Search .............................. 137/540, 543.17, 137/543.21; 251/367

[56] References Cited

U.S. PATENT DOCUMENTS

| | | | |
|---|---|---|---|
| 1,322,638 | 11/1919 | Smolensky | 137/540 |
| 1,668,453 | 5/1928 | Graesser et al. | 137/540 |
| 1,804,897 | 5/1931 | Thomas | 137/540 |
| 1,841,029 | 1/1932 | Hamilton | 137/540 |
| 1,886,205 | 11/1932 | Lyford | 137/543.17 |
| 2,704,549 | 3/1955 | Strnad | 137/540 |
| 2,758,609 | 8/1956 | Dickert et al. | |
| 2,840,107 | 6/1958 | Campbell | 137/540 |
| 2,875,779 | 3/1959 | Campbell | 137/543.17 |
| 3,084,707 | 4/1963 | Frye | |
| 3,270,771 | 9/1966 | Morgan et al. | |
| 3,599,657 | 8/1971 | Maldavs | |
| 4,089,349 | 5/1978 | Schenk | |
| 4,286,636 | 9/1981 | Credle | |
| 4,593,720 | 6/1986 | Bergandy | |
| 4,625,761 | 12/1986 | Uchida et al. | |
| 4,712,583 | 12/1987 | Pelmulder et al. | |
| 4,768,547 | 9/1988 | Danby et al. | |
| 5,025,829 | 6/1991 | Edwards et al. | |
| 5,215,538 | 6/1993 | Larkin | |
| 5,255,713 | 10/1993 | Scholle et al. | |
| 5,332,000 | 7/1994 | Gassner | |
| 5,477,883 | 12/1995 | Totten | |
| 5,577,533 | 11/1996 | Cook, Jr. | 137/540 |

FOREIGN PATENT DOCUMENTS

| | | | |
|---|---|---|---|
| 1650 946 | 10/1970 | Germany | 137/543.17 |
| 153 070 | 10/1920 | United Kingdom | 137/540 |

*Primary Examiner*—Denise L. Ferensic
*Assistant Examiner*—Joanne Y. Kim
*Attorney, Agent, or Firm*—Baker & McKenzie

[57] ABSTRACT

A corrosion resistant check valve having plastic components in the fluid path is provided. The check valve broadly comprises an inlet housing, an outlet housing, a valve poppet, and a spring. The inlet housing has an inlet passageway and the outlet housing has an outlet passageway. The inlet housing and outlet housing are connected to define an internal chamber of the check valve. An inner portion of the inlet housing has a transverse wall which includes a valve seat surface and a central hole which defines a flow passageway between the inlet passageway and the internal chamber. The valve poppet is disposed within the internal chamber and has a disk-shaped body and a stem extending perpendicularly outward from a centerpoint of the body. The stem of the valve poppet is positioned in a central bore in a planar end surface of the spring. The planar end surface of the spring also includes fluid flow passages disposed about the central bore. In operation, the spring biases the valve poppet into sealing engagement with the valve seat surface to control fluid flow from the inlet passageway into the internal chamber. When the fluid pressure in the inlet passageway exceeds the biasing force of the spring, the valve poppet unseats from the valve seat surface and fluid flows around the valve poppet, through the fluid flow passages in the spring and out of the outlet passageway.

23 Claims, 4 Drawing Sheets

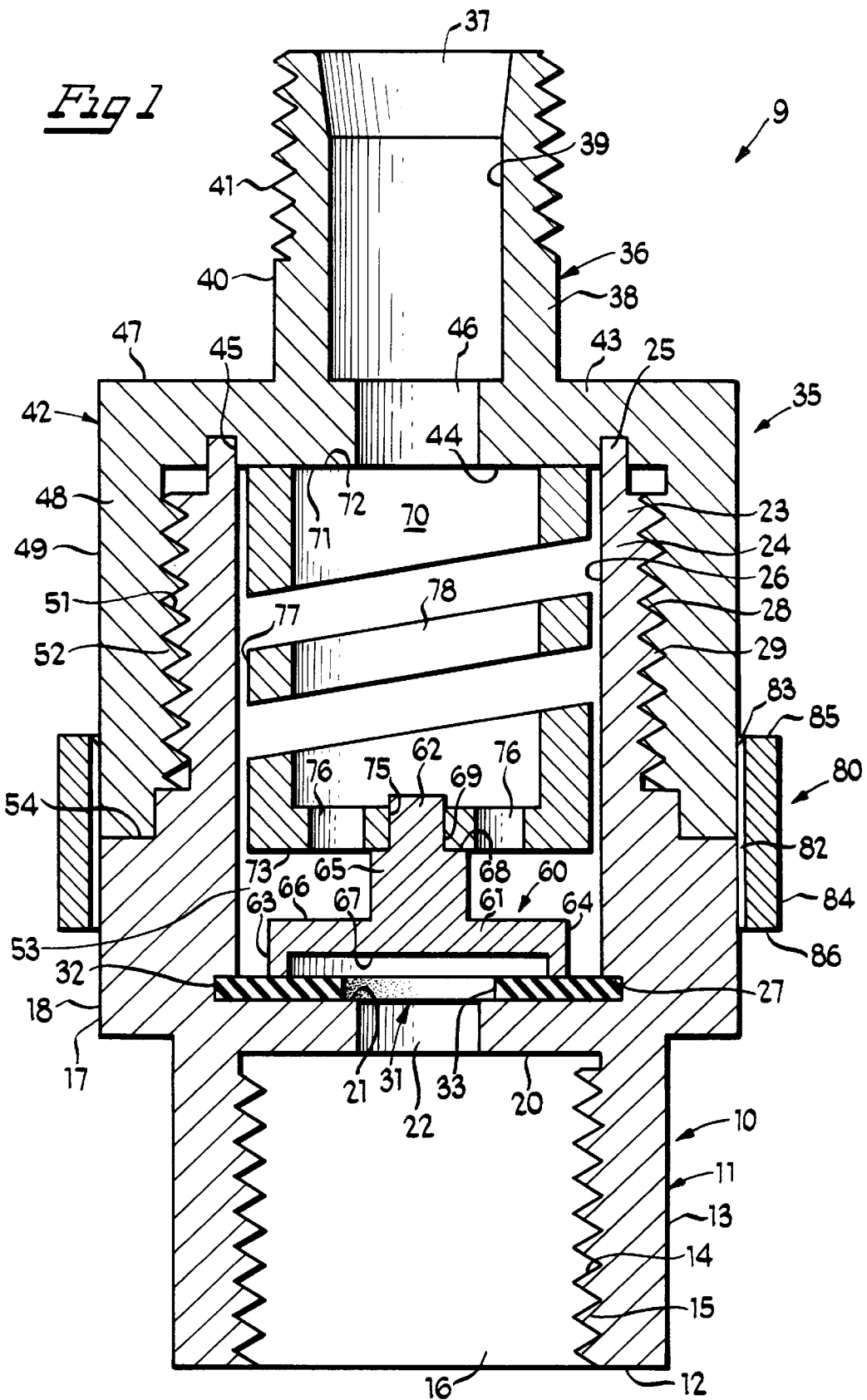

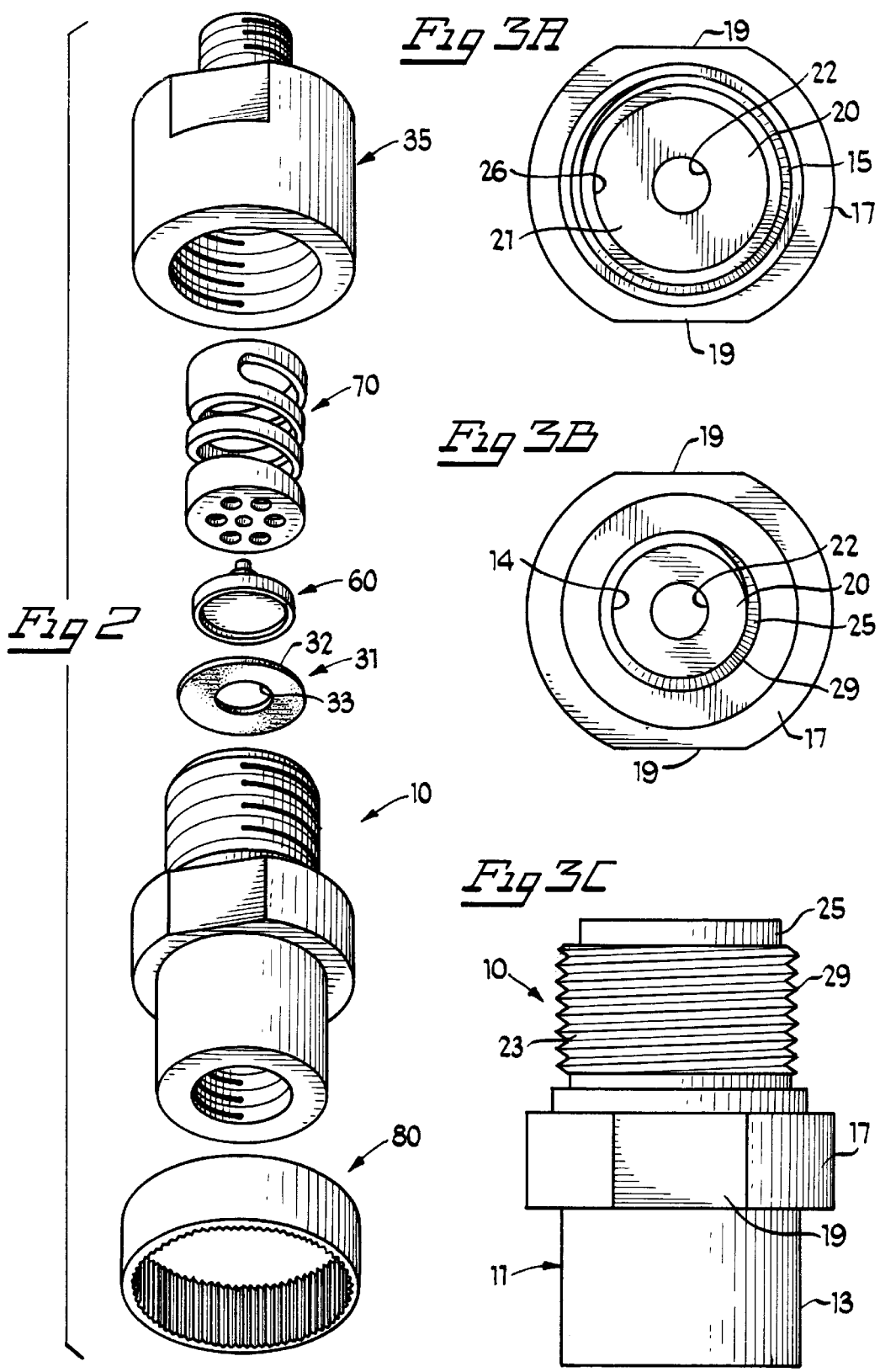

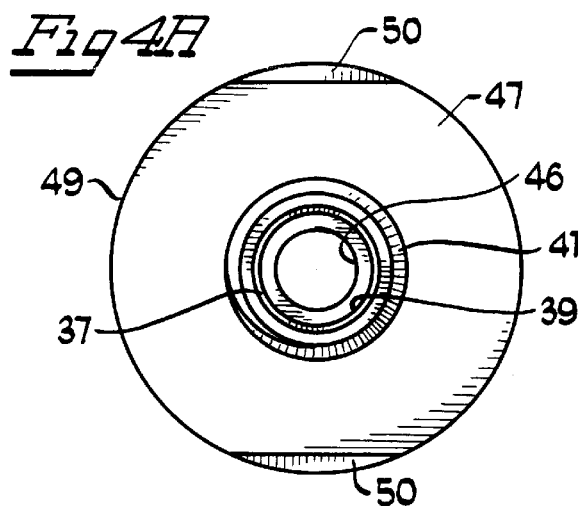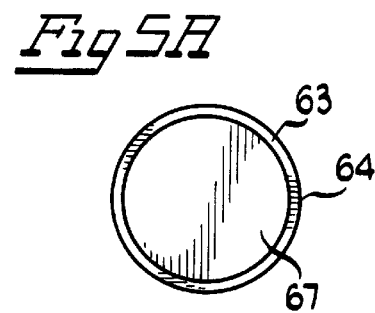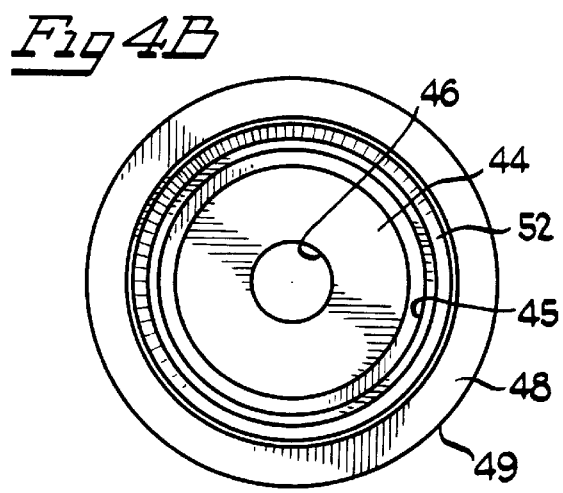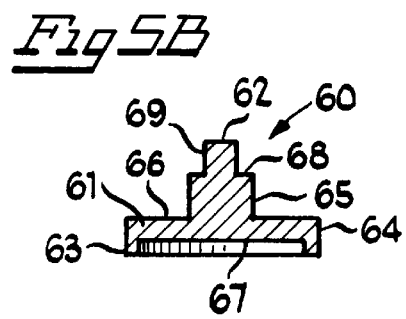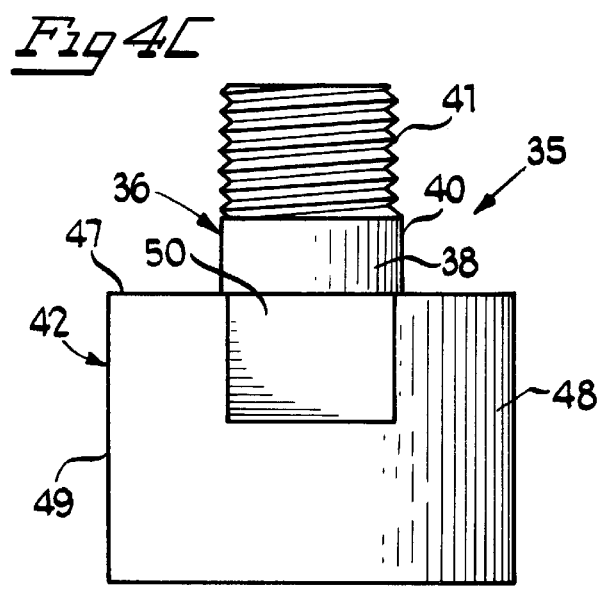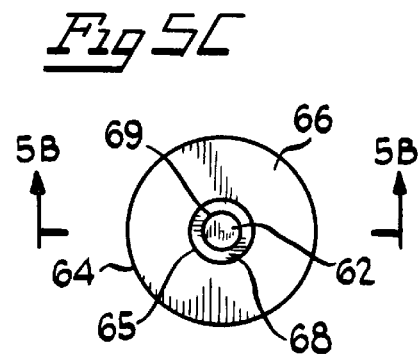

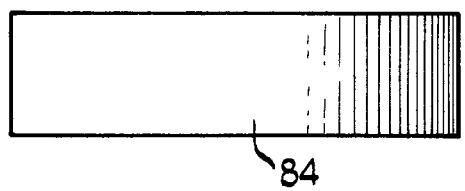
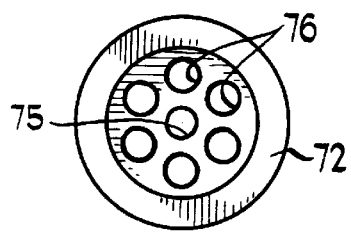
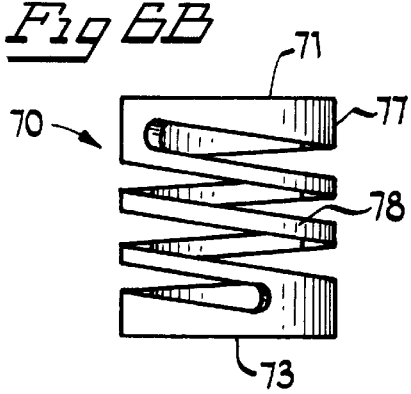
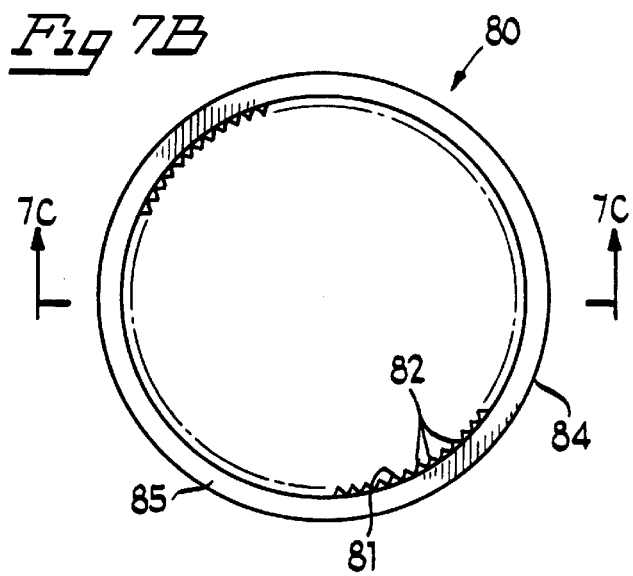
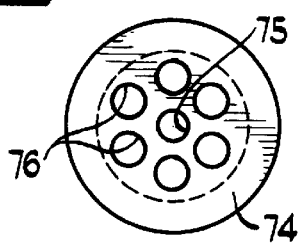
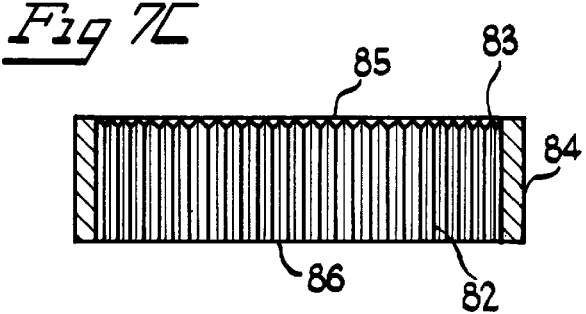

CHECK VALVE

BACKGROUND AND SUMMARY OF THE INVENTION

1. Field of the Invention

This invention relates generally to check valves and more specifically to a check valve particularly advantageous as a flow control device in systems designed for transporting corrosive fluids.

2. Description of the Related Art

Certain critical applications require relief or check valves that are resistant to chemical substances and which enable safe feeding of corrosive fluids to an apparatus. For example, the wet etching of semiconductors requires the use of fluid delivery devices that precisely control the amount of fluid delivered to the surface of the semiconductor and that limit the introduction of foreign matter into the etching fluid. It is particularly critical in these applications that the etching fluids remain free from particulate matter as the particulates may contaminate the semiconductor surface. Unfortunately, the liquids used for the wet etching of semiconductors typically include hydrofluoric acid, which is known to dissolve metals and glass. Consequently, the hydrofluoric acid in the etching liquids may pass over metal or glass components in the fluid path and introduce particulate matter into the etching liquid. Therefore, it is recommended that the fluid path in devices that feed hydrofluoric acid to a semiconductor surface be free from components made of metal or glass. Unfortunately, many check valve designs require the use of metal springs in the valve fluid path.

The problems associated with the corrosion of valve components can be overcome by selecting a check valve design which incorporates plastic components. Various check valves having plastic components have been proposed. For example, U.S. Pat. No. 4,625,761 is directed to a coupling assembly for piping designed for use in transporting corrosive fluids such as the hydrofluoric acid that is usually used for wet etching of semiconductors. In the coupling assembly of this patent, the bodies of the assembly and the valve means of the assembly are made from a fluoroplastic, while the O-rings of the valve assembly are made from a fluororubber. In addition, the valve springs are coated with a fluoroplastic.

U.S. Pat. No. 4,286,636 discloses a dip tube which has a self-sealing valve which includes a valve seat, a poppet which is movable into or out of the valve seat and a spring means for biasing the poppet into sealing engagement with the valve seat. Each of the components of the valve are molded from inexpensive plastic material. In addition, the spring means of this valve can be integrally molded with the poppet. In other words, the poppet and the spring are a one piece molded plastic part.

U.S. Pat. No. 5,255,713 discloses a flow control device having a valve body with an internal passageway, a valve seat in the passageway, and a poppet engageable with the valve seat. The poppet of this invention has a number of spring-like elements which project toward the inlet end. The spring-like elements engage the sidewalls of the passageway and act as leaf springs which exert a resilient force which biases the poppet against the valve seat. The valve body and poppet may be made of plastic.

U.S. Pat. No. 5,477,883 discloses a self-sealing valve having plastic components. The self-sealing valve includes a housing having two open ends, a valve seat within the housing, a valve poppet which moves in and out of sealing engagement with the valve seat to open and close the valve, and a plastic spring for biasing the poppet into sealing engagement with the valve seat.

While the aforementioned designs may be satisfactory in certain applications, check valves having all plastic components may have drawbacks. For instance, the plastic spring used in this type of check valve may be unstable because of the material used in fabricating the spring and because of the construction of the spring. Often, plastic springs can be difficult to mold and the tooling required for molding can be quite expensive. In addition, while efforts aimed at limiting the number of components in a check valve often result in a design having a small number of components, the plastic components often have an intricate configuration that raises manufacturing costs. Furthermore, the check valves may be expensive and difficult to manufacture because of the tight tolerances required on machined and polished surfaces.

Therefore, in spite of the availability of corrosion resistant check valves such as those described above, there still exists a continuing need to provide improved corrosion resistant check valve designs having components that can be manufactured in a cost effective manner.

It is therefore an object of the present invention to provide a corrosion resistant check valve that can be assembled from a minimum number of components that do not have to be fabricated using expensive manufacturing processes.

Yet another object of the present invention is to provide a corrosion resistant check valve assembled from components that are manufactured using materials and designs that result in stable check valve operation.

SUMMARY OF THE INVENTION

The present invention makes a significant contribution to the check valve art by providing an improved corrosion resistant check valve which overcomes the disadvantages of the prior art. In the corrosion resistant check valve of the present invention, the number of parts is minimized, the cost of construction is reduced by limiting the complexity of the manufacturing process used to fabricate components of the check valve, and the construction of the components of the check valve provides for more stable operation.

A corrosion resistant check valve having the features of the present invention broadly comprises an inlet housing, an outlet housing, a valve poppet, and a spring. The inlet housing has an inlet passageway and an outer surface having external threads. The outlet housing has an outlet passageway and an inner surface having internal threads. The external threads and the internal threads are dimensioned so that the inlet housing and outlet housing can be screwed together to define an internal chamber of the check valve. When the inlet housing and outlet housing are screwed together, the internal chamber of the check valve is in communication with both the inlet passageway and the outlet passageway.

A transverse wall separates the inlet passageway and the internal chamber of the check valve. The transverse wall includes a valve seat surface and a central hole which defines a flow passageway between the inlet passageway and the internal chamber. An annular valve seat seal may be disposed on the valve seat surface.

The valve poppet is disposed within the internal chamber and includes a disk-shaped body, an annular sealing surface disposed on the periphery of the disk-shaped body, a stem extending perpendicularly outward from a centerpoint of the body, and a collar surrounding the stem at a location where the stem is connected to the disk-shaped body. The valve poppet is movable into or out of sealing engagement with the valve seat by the spring. The valve poppet and spring cooperate to control fluid flow from the inlet passageway into the internal chamber.

The spring is preferably a helical coil spring having a first end which engages an end surface of the internal chamber and a second end which has a surface including a central bore and a plurality of circular fluid flow passages disposed about the central bore. When the check valve is assembled, the valve poppet stem is positioned in the central bore of the surface of the second end of the spring such that the collar of the valve poppet engages the surface of the second end of the spring.

In this arrangement of the spring and valve poppet, the central bore in the surface of the second end of the spring carries and guides the valve poppet when the check valve is opened and closed. Therefore, the cooperation of the valve poppet collar, the valve poppet stem, and the center bore in the surface of the second end of the spring keep the valve poppet centered and square to the valve seal.

In the checked flow position, the spring biases the valve poppet against the valve seat surface, or optionally the annular valve seat seal which is disposed on the valve seat surface, preventing fluid flow through the internal chamber and out of the outlet passageway. When sufficient fluid pressure is applied to the valve poppet, the biasing force of the spring is overcome and the valve poppet disengages from the valve seat surface or the annular valve seat seal. Fluid then flows around the valve poppet and through the circular fluid flow passages in the surface of the second end of the spring. The fluid continues on through the internal chamber and out of the outlet passageway.

The corrosion resistant check valve may further include a lock ring that is placed over a mating line that is formed between the inlet housing and the outlet housing when the inlet housing and outlet housing are screwed together. The lock ring helps prevent a leak at the connection of the housings by overcoming any tendency of the inlet housing and outlet housing to turn or loosen after the housings are screwed together. Advantageously, the lock ring includes ridges on an inner surface which grip a portion of the outer surface of the inlet housing and a portion of an outer surface of the outlet housing when the lock ring is assembled on the check valve.

The corrosion resistant check valve design of the present invention has advantages over other check valve designs known in the art. The check valve can be assembled using as few as four components. The spring design and materials provide for a plastic spring that is more stable than other plastic spring designs, which results in improved check valve reliability. In addition, the spring can be fabricated without the use of expensive molding processes. Furthermore, the manufacturing steps used in fabricating the components can be minimized as the only component of the check valve of the present invention that is required to have a polished surface is the valve poppet.

BRIEF DESCRIPTION OF THE DRAWINGS

These and other features, aspects, objects, and advantages of the present invention will be become better understood upon consideration of the following detailed description, appended claims and accompanying drawings where:

FIG. 1 is a cross-sectional view of a check valve made in accordance with the present invention;

FIG. 2 is an exploded view of the components of a check valve made in accordance with the present invention;

FIG. 3A is a top view, as seen looking into the check valve, of the inlet housing of a check valve made in accordance with the present invention;

FIG. 3B is a bottom view of the inlet housing of a check valve made in accordance with the present invention;

FIG. 3C is a side view of the inlet housing of a check valve made in accordance with the present invention;

FIG. 4A is a top view, as seen looking into the check valve, of the outlet housing of a check valve made in accordance with the present invention;

FIG. 4B is a bottom view of the outlet housing of a check valve made in accordance with the present invention;

FIG. 4C is a side view of the outlet housing of a check valve made in accordance with the present invention;

FIG. 5A is a top view of the valve poppet of a check valve made in accordance with the present invention;

FIG. 5B is a sectional view of the valve poppet of a check valve made in accordance with the present invention taken along line 5B—5B of FIG. 5C;

FIG. 5C is a bottom view of the valve poppet of a check valve made in accordance with the present invention;

FIG. 6A is a bottom view of the spring of a check valve made in accordance with the present invention;

FIG. 6B is a side view of the spring of a check valve made in accordance with the present invention;

FIG. 6C is a top view of the spring of a check valve made in accordance with the present invention;

FIG. 7A is a side view of the lock ring of a check valve made in accordance with the present invention;

FIG. 7B is a top view of the lock ring of a check valve made in accordance with the present invention; and FIG. 7C is a sectional view of the lock ring of a check valve made in accordance with the present invention taken along line 7C—7C of FIG. 7B.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DESCRIPTION OF THE PREFERRED EMBODIMENTS

Referring now to FIGS. 1 and 2, a check valve according to the present invention is shown. The check valve 9 broadly comprises an inlet housing 10, an outlet housing 35, an annular valve seat seal 31, a valve poppet 60, a helical coil spring 70, and a lock ring 80.

Referring now to FIGS. 1, 3A, 3B, and 3C, the inlet housing 10 comprises an inlet port 11, a circular raised collar 17, a transverse wall 20, and a mating portion 23. The inlet port 11 of the inlet housing 10 has a cylindrical wall 12 which defines an inlet passageway 16. The cylindrical wall 12 has an outer surface 13 and an inner surface 14. The inner surface 14 of the cylindrical wall 12 of the inlet port 11 has threads 15. The mating portion 23 of the inlet housing 10 has a cylindrical wall 24 which has a circumferential end portion 25, an inner surface 26, and an outer surface 28. The inner surface 26 of the cylindrical wall 24 has an annular groove 27. The outer surface 28 of the cylindrical wall 24 has threads 29. The circular raised collar 17 of the inlet housing 10 joins the inlet port 11 and the mating portion 23 of the inlet housing 10. The circular raised collar 17 has an outer surface 18 with opposed flat sections 19 which assist a user in grasping the inlet housing 10. The transverse wall 20 of the inlet housing 10 includes a valve seat surface 21 and a central hole 22.

Turning now to FIGS. 1, 4A, 4B, and 4C, the outlet housing 35 of the check valve 9 comprises an outlet port 36 and a mating portion 42. The outlet port 36 includes an outlet passageway 37 and a cylindrical wall 38. The cylindrical wall 38 has an inner surface 39 and an outer surface 40 which has threads 41. The mating portion 42 of the outlet housing 35 has a top wall 43 and cyindrical side wall 48. The top wall 43 has an inner surface 44, a central hole 46 and an outer surface 47. The inner surface 44 of the top wall 43 has a circular groove 45. The cylindrical side wall 48 of the mating portion 42 of the outlet housing 35 has an outer surface 49 and an inner surface 51. The outer surface 49 of the cylindrical side wall 48 has opposed flat sections 50 which assist in gripping the outlet housing 45. The inner surface 51 of the cylindrical side wall 48 has threads 52.

Referring now to FIGS. 1 and 2, the annular valve seat seal 31 of the check valve 9 has a periphery 32 and a center hole 33. It is preferred that the annular valve seat seal 31 be fabricated from a corrosion resistant synthetic rubber. In a most preferred version of the invention, the annular valve seat seal is fabricated from ethylene propylene rubber or a perfluoroelastomer such as is commonly sold under the trademark Kalrez®. The annular valve seat seal 31 is disposed in the annular groove 27 of the inner surface 26 of the mating portion 23 of the inlet housing 10. As seen in FIG. 1, the annular valve seat seal 31 contacts the valve seat surface 21 of the transverse wall 20 of the inlet housing 10.

Turning now to FIGS. 1, 5A, 5B, and 5C, the valve poppet 60 of the check valve 9 comprises a disk shaped body 61, a cylindrical stem 62, an annular sealing surface 63 and an annular collar 65. The disk shaped body 61 of the valve poppet 60 has a periphery 64, a bottom surface 66 and a top surface 67. The annular sealing surface 63 of the valve poppet 60 is disposed about the periphery 64 of the body 61 of the valve poppet 60. The stem 62 of the valve poppet 60 is connected to the body 61 of the valve poppet 60 at a centerpoint of the bottom surface 66 of the body 61 of the valve poppet 60. The stem 61 of the valve poppet 60 has an outer surface 69. The collar 65 of the valve poppet 60 surrounds the stem 62 of the valve poppet 60 at a location where the stem 62 and the body 61 of the valve poppet are connected. The collar 65 of the valve poppet 60 has a top surface 68 which is generally parallel to the bottom surface 66 of the body 61 of the valve poppet 60.

Referring now to FIGS. 1, 6A, 6B, and 6C, there is shown a helical coil spring 70 having a first end 71, a second end 73 and an outer surface 77. The coils 78 of the spring 70 are closed at the first end 71 and the second end 73 to control the squareness of the ends 71, 73 of the spring 70 to the axis of the spring. In the embodiment shown, the coils 78 of the spring 70 have a generally rectangular cross section. The first end 71 of the spring 70 has a circumferential bearing surface 72. The second end 73 of the spring 70 has a circular planar bearing surface 74. The bearing surface 74 has a central bore 75 and fluid flow passages 76 radially disposed about the center bore 75 in the bearing surface 74.

Turning now to FIGS. 1, 7A, 7B and 7C, there is shown a lock ring 80 having an inner surface 81, an outer surface 84, a first edge 85 and a second edge 86. There are protruding ridges or knurls 82 on the inner surface 81 of the lock ring 80. In addition, there is a chamfer 83 on the inner surface 81 at the first edge 85 of the lock ring 80. It is contemplated that aluminum would be a suitable material for the lock ring, and preferably the aluminum has been surface treated with a surface finish such as nickel plating.

Regarding the materials selected for the fabrication of the components of the check valve, it is preferred that the inlet housing, outlet housing, valve poppet, and spring are fabricated from a synthetic plastic. Most preferably, the inlet housing, outlet housing, valve poppet, and spring are fabricated from a fluoroplastic, which is defined as a plastic having fluorine groups. For example, the spring is preferably fabricated from polytetrafluoroethylene, such as is sold under the trademark Teflon®, or chlorotrifluoroethylene, such as is sold under the trademark Kel-F®. The valve poppet is also preferably fabricated from polytetrafluoroethylene, such as is sold under the trademark Teflon®.

When the inlet housing 10, outlet housing 35, annular valve seat seal 31, valve poppet 60, helical coil spring 70, and lock ring 80 are assembled, the check valve 9 of the present invention is configured as shown in FIG. 1. In order to assemble the check valve 9, the inlet housing 10 and the outlet housing 35 are screwed together. Specifically, the threads 29 on the outer surface 28 of the mating portion 23 of the inlet housing 10 are coupled with the threads 52 on the inner surface 51 of the cylindrical side walls 48 of the mating portion 42 of the outlet housing 35. The threads 29 and the threads 52 are dimensioned such that the inlet housing 10 and the outlet housing 35 form a snug connection when the inlet housing 10 and the outlet housing 35 are screwed together. It can be seen from FIG. 1 that the circumferential end portion 25 of the cylindrical wall 24 of the mating portion 23 of the inlet housing 10 is aligned in the circular groove 45 in the inner surface 44 of the top wall 43 of the mating portion 42 of the outlet housing 35 when the inlet housing 10 and outlet housing 35 are screwed together. It can also be seen from FIG. 1 that the outer surface 49 of the cylindrical side wall 48 of the mating portion 42 of the outlet housing 35 and the outer surface 18 of the circular raised collar 17 of the inlet housing 10 form a single outer surface of the check valve 9 when the inlet housing 10 and outlet housing 35 are screwed together. It can also be seen that a mating line 54 is formed between the circular raised collar 17 of the inlet housing 10 and the cylindrical side wall 48 of the mating portion 42 of the outlet housing 35.

When the inlet housing 10 and the outlet housing 35 are connected together, they define an internal chamber 53 in the check valve 9. The inner side wall of the internal chamber 53 is defined by the inner surface 26 of the cylindrical wall 24 of the mating portion 23 of the inlet housing 10. The end wall of the internal chamber 53 nearest the outlet port 36 is defined by the inner surface 44 of the top wall 43 of the mating portion 42 of the outlet housing 35. The end wall of the internal chamber 53 nearest the inlet port 11 is defined by the valve seat surface 21 of the transverse wall 20 of the inlet housing 10.

In the assembled condition of the check valve 9, the helical coil spring 70, the valve poppet 60 and the annular valve seat seal 31 are disposed within the internal chamber 53. The bearing surface 72 of the first end 71 of the spring 70 contacts the inner surface 44 of the top wall 43 of the mating portion 42 of the outlet housing 35. The outer surface 77 of the spring 70 is in virtual contact with the inner surface 26 of the cylindrical wall 25 of the mating portion 23 of the inlet housing 10. Therefore, the spring 70 is maintained in a centered position in the internal chamber 53.

As detailed above, the annular valve seat seal 31 is disposed in the annular groove 27 of the inner surface 26 of the cylindrical wall 24 of the mating portion 23 of the inlet housing 10. The annular groove 27 is dimensioned to hold captive and centered the annular valve seat seal 31. Specifically, the annular groove 27 is dimensioned such that the periphery 32 of the annular valve seat seal 31 substantially contacts the inner surfaces of the annular groove 27.

The valve poppet 60 is held centered in the internal chamber 53 of the check valve 9 by the spring 70. Specifically, the outer surface 69 of the stem 62 of the valve poppet 60 is imensioned so as to fit in the central bore 75 in the bearing surface 74 of the second end 73 of the spring 70. When the stem 62 of the valve poppet 60 is placed in the central bore 75 of the bearing surface 74 of the second end 73 of the spring 70, the bottom surface 68 of the collar 65 of the valve poppet 60 contacts the bearing surface 74 of the second end 73 of the spring 70. In this arrangement, the spring 70 can guide the valve poppet 60 into engagement with the annular valve seat seal 31. It can be seen from FIG. 1 that the annular sealing surface 63 of the valve poppet 60 contacts the annular valve seat seal 31 when the poppet 60 is spring biased toward the inlet port 11. The annular sealing surface 63 of the valve poppet 60 is a single sealing surface which requires a lower precision of machining to seal with the annular valve seat seal 31 than in other check valve designs.

In a preferred embodiment of the check valve 9, the lock ring 80 is positioned over the mating line 54 that is formed between the inlet housing 10 and the outlet housing 35 when the inlet housing 10 and the outlet housing 35 are screwed together. The lock ring 80 helps prevent a leak at the connection of the housings by overcoming any tendency of the inlet housing 10 and the outlet housing 35 to turn or loosen after the housings are screwed together. The lock ring 80 is configured so as to permit both ease of installation and a secure fit when the lock ring 80 is assembled on the check valve 9. Namely, the chamfer 83 on the inner surface 81 at the first edge 85 of the lock ring 80 assists in guiding the lock ring 80 onto the outer surface 18 of the circular raised collar 17 of the inlet housing 10 when the lock ring 80 is placed on the check valve 9. In addition, the protruding ridges 82 on the inner surface 81 of the lock ring 80 grip a portion of the outer surface 18 of the circular raised collar 17 of the inlet housing 10 and a portion of the outer surface 49 of the mating portion 42 of the outlet housing 35 when the lock ring 80 is assembled on the check valve 9. This gripping action resists any tendency of the inlet housing 10 and outlet housing 35 to turn or loosen after assembly.

The check valve 9 of the present invention may be installed and operated in a fluid delivery system in the following manner. A fluid inlet conduit having a threaded coupling is screwed into the threads 15 on the inner surface 14 of the cylindrical wall 12 of the inlet port 11. A fluid outlet conduit having a threaded coupling is screwed onto the threads 41 on the outer surface 40 of the cylindrical wall 38 of the outlet port 36. Fluid is then introduced into the fluid inlet conduit. The fluid enters through the inlet passageway 16 of the inlet port 11 and passes through the central hole 22 in the transverse wall 20 of the inlet housing 10 and the center hole 33 of the annular valve seat seal 31.

Upon passing through the center hole 33 of the annular valve seat seal 31, the fluid exerts pressure on the top surface 67 of the body 61 of the valve poppet 60. At lower fluid pressures, the annular sealing surface 63 of the valve poppet 60 remains in sealing contact with the annular valve seat seal 31 as the biasing force of the spring 70 biases the valve poppet 60 against the annular valve seat seal 31. As the fluid pressure force exerted on the top surface 67 of the body 61 of the valve poppet 60 exceeds the biasing force of the spring 70, the annular sealing surface 63 of the valve poppet 60 will unseat from the annular valve seat seal 31 and move toward the outlet port 36 of the check valve 9. When the valve poppet 60 is unseated, fluid can pass between the annular sealing surface 63 of the valve poppet 60 and the annular valve seat seal 31, relieving pressure in the fluid inlet conduit. The fluid continues around the valve poppet 60 and passes through the fluid flow passages 76 in the bearing surface 74 in the second end 73 of the spring 70. While fluid flow between the outer surface 77 of the spring 77 and the side wall of the internal chamber 53 is possible, fluid flow through the fluid flow passages 76 provides the majority of the fluid flow. The fluid then flows sequentially through the internal chamber 53, the hole 46 in the top wall 43 of the mating portion 42 of the outlet housing 35, and the outlet passageway 37 of the outlet port 36 into the fluid outlet conduit.

When the valve poppet 60 is in the open position, i.e. the valve poppet 60 is unseated from the annular valve seat seal 31, the stem 62 of the valve poppet 60 remains in the central bore 75 in the bearing surface 74 of the second end 73 of the spring 70 in order to guide the movement of the valve poppet 60 during opening and closing of the valve. This assures that the annular sealing surface 63 of the valve poppet 60 squarely reseats on the annular valve seat seal 31 when the fluid pressure force exerted by the fluid on the top surface 67 of the body 61 of the valve poppet 60 falls below the biasing force of the spring 70.

Thus, it is seen that an improved corrosion resistant check valve is provided. The corrosion resistant check valve of the present invention has a minimum number of parts, has a reduced cost of construction as the complexity of the manufacturing process used to fabricate components of the check valve is limited, and provides for more stable operation than other check valves having plastic components.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A corrosion resistant check valve comprising:

an inlet housing having an inlet passageway;

an outlet housing having an outlet passageway;

means for connecting the inlet housing to the outlet housing to define an internal chamber communicating with the inlet passageway and the outlet passageway;

a transverse wall separating the inlet passageway and the internal chamber, the transverse wall including a valve seat surface and a central hole defining a flow passageway between the inlet passageway and the internal chamber;

a valve poppet within the internal chamber, the valve poppet having a disk-shaped body and a stem extending perpendicularly outward from a centerpoint of the body, the valve poppet being movable into or out of sealing engagement with the valve seat surface to control fluid flow from the inlet passageway into the internal chamber; and a spring for normally biasing the valve poppet into sealing engagement with the valve seat surface, the spring having a first end engaging an end surface of the internal chamber, and a second end having a surface including a central bore and a plurality of fluid flow passages disposed about the central bore, the valve poppet stem being positioned in the central bore of the surface of the second end of the spring.

2. The corrosion resistant check valve of claim 1 further including an annular valve seat seal disposed on the valve seat surface, the valve poppet being movable into or out of sealing engagement with the valve seat seal.

3. The corrosion resistant check valve of claim 2 wherein the valve poppet further includes an annular sealing surface disposed on the periphery of the disk-shaped body of the valve poppet, the annular sealing surface contacting the valve seat seal when the valve poppet is moved into engagement with the valve seat seal.

4. The corrosion resistant check valve of claim 3 wherein the valve poppet further includes a collar surrounding the stem at a location where the stem is connected to the disk-shaped body of the valve poppet, the collar engaging the surface of the second end of the spring when the stem is positioned in the central bore of the surface of the second end of the spring.

5. The corrosion resistant check valve of claim 2 wherein the annular valve seat seal is fabricated from a synthetic rubber, and wherein the inlet housing, outlet housing, valve poppet, and spring are fabricated from a synthetic plastic.

6. The corrosion resistant check valve of claim 5 wherein the synthetic rubber is selected from the group consisting of ethylene propylene rubber and perfluoroelastomer, and wherein the synthetic plastic is a fluoroplastic.

7. The corrosion resistant check valve of claim 1 wherein the means for connecting the outlet housing to the inlet housing comprises:

external threads disposed on an outer surface of the inlet housing; and internal threads disposed on an inner surface of the outlet housing, the external threads and the internal threads being dimensioned so as to engage when the inlet housing and outlet housing are screwed together.

8. The corrosion resistant check valve of claim 7 further including a lock ring disposed over a mating line formed between the inlet housing and the outlet housing when the inlet housing and outlet housing are connected.

9. The corrosion resistant check valve of claim 8 wherein the lock ring includes a plurality of ridges on an inner surface of the lock ring, the ridges gripping a portion of the outer surface of the inlet housing and a portion of an outer surface of the outlet housing.

10. The corrosion resistant check valve of claim 1 wherein the spring is a helical coil spring and the fluid flow passages in the surface of the second end of the spring are circular and are radially disposed about the central bore.

11. A corrosion resistant check valve comprising:

an inlet housing having an inlet passageway;

an outlet housing having an outlet passageway;

means for connecting the inlet housing to the outlet housing to define an internal chamber communicating with the inlet passageway and the outlet passageway;

a transverse wall separating the inlet passageway and the internal chamber, the transverse wall including a valve seat surface and a central hole defining a flow passageway between the inlet passageway and the internal chamber;

an annular valve seat seal disposed on the valve seat surface;

a valve poppet within the internal chamber, the valve poppet having a disk-shaped body and a stem extending perpendicularly outward from a centerpoint of the body, the valve poppet being movable into or out of sealing engagement with the valve seat seal to control fluid flow from the inlet passageway into the internal chamber; and a spring for normally biasing the valve poppet into sealing engagement with the valve seat seal, the spring having a first end engaging an end surface of the internal chamber, and a second end having a surface including a central bore and a plurality of fluid flow passages disposed about the central bore, the valve poppet stem being positioned in the central bore of the surface of the second end of the spring.

12. The corrosion resistant check valve of claim 11 wherein the valve poppet further includes an annular sealing surface disposed on the periphery of the disk-shaped body of the valve poppet, the annular sealing surface contacting the valve seat seal when the valve poppet is moved into engagement with the valve seat seal, and a collar surrounding the stem at a location where the stem is connected to the disk-shaped body of the valve poppet, the collar engaging the surface of the second end of the spring when the stem is positioned in the central bore of the surface of the second end of the spring.

13. The corrosion resistant check valve of claim 12 wherein the annular valve seat seal is fabricated from a synthetic rubber, and wherein the inlet housing, outlet housing, valve poppet, and spring are fabricated from a synthetic plastic.

14. The corrosion resistant check valve of claim 13 wherein the synthetic rubber is selected from the group consisting of ethylene propylene rubber and perfluoroelastomer, and wherein the synthetic plastic is a fluoroplastic.

15. The corrosion resistant check valve of claim 11 wherein the means for connecting the outlet housing to the inlet housing comprises:

external threads disposed on an outer surface of the inlet housing; and internal threads disposed on an inner surface of the outlet housing, the external threads and the internal threads being dimensioned so as to engage when the inlet housing and outlet housing are screwed together.

16. The corrosion resistant check valve of claim 15 further including a lock ring disposed over a mating line formed between the inlet housing and the outlet housing when the inlet housing and outlet housing are connected.

17. The corrosion resistant check valve of claim 16 wherein the lock ring includes a plurality of ridges on an inner surface of the lock ring, the ridges gripping a portion of the outer surface of the inlet housing and a portion of an outer surface of the outlet housing.

18. The corrosion resistant check valve of claim 11 wherein the spring is a helical coil spring and the fluid flow passages in the surface of the second end of the spring are circular and are radially disposed about the central bore.

19. A corrosion resistant check valve comprising:

an inlet housing having an inlet passageway;

an outlet housing having an outlet passageway;

means for connecting the inlet housing to the outlet housing to define an internal chamber communicating with the inlet passageway and the outlet passageway;

a transverse wall separating the inlet passageway and the internal chamber, the transverse wall including a valve seat surface and a central hole defining a flow passageway between the inlet passageway and the internal chamber;

an annular valve seat seal disposed on the valve seat surface;

a valve poppet within the internal chamber, the valve poppet having a disk-shaped body, an annular sealing surface disposed on the periphery of the disk-shaped body, a stem extending perpendicularly outward from a centerpoint of the body, and a collar surrounding the stem at a location where the stem is connected to the disk-shaped body, the valve poppet being movable into or out of sealing engagement with the valve seat seal to control fluid flow from the inlet passageway into the internal chamber, the annular sealing surface of the valve poppet being in contact the valve seat seal when the valve poppet is moved into engagement with the valve seat seal; and a helical coil spring for normally biasing the valve poppet into sealing engagement with the valve seat seal, the spring having a first end engaging an end surface of the internal chamber, and a second end having a surface including a central bore and a plurality of circular fluid flow passages disposed about the central bore, the valve poppet stem being positioned in the central bore of the surface of the second end of the spring such that the collar of the valve poppet engages the surface of the second end of the spring.

20. The corrosion resistant check valve of claim 19 wherein the annular valve seat seal is fabricated from a synthetic rubber, and wherein the inlet housing, outlet housing, valve poppet, and spring are fabricated from a synthetic plastic.

21. The corrosion resistant check valve of claim 20 wherein the synthetic rubber is selected from the group consisting of ethylene propylene rubber and perfluoroelastomer, and wherein the synthetic plastic is a fluoroplastic.

22. The corrosion resistant check valve of claim 19 wherein the means for connecting the outlet housing to the inlet housing comprises:

external threads disposed on an outer surface of the inlet housing; and internal threads disposed on an inner surface of the outlet housing, the external threads and the internal threads being dimensioned so as to engage when the inlet housing and outlet housing are screwed together.

23. The corrosion resistant check valve of claim 22 further including a lock ring disposed over a mating line formed between the inlet housing and the outlet housing when the inlet housing and outlet housing are connected, said lock ring including a plurality of ridges on an inner surface of the lock ring, the ridges gripping a portion of the outer surface of the inlet housing and a portion of an outer surface of the outlet housing.

* * * * *